United States Patent [19]

Gamay

[11] Patent Number: 5,221,554
[45] Date of Patent: * Jun. 22, 1993

[54] PROCESS FOR PRODUCING LOW-FAT MEAT PRODUCTS

[76] Inventor: Aly Gamay, 4020 S. Avon Dr., New Berlin, Wis. 53132

[*] Notice: The portion of the term of this patent subsequent to Dec. 1, 2009 has been disclaimed.

[21] Appl. No.: 926,731

[22] Filed: Aug. 6, 1992

Related U.S. Application Data

[63] Continuation-in-part of Ser. No. 813,317, Dec. 24, 1991, Pat. No. 5,167,977.

[51] Int. Cl.⁵ .............................................. A23L 1/31
[52] U.S. Cl. ................................. 426/646; 426/417; 426/480
[58] Field of Search ............... 426/417, 646, 478, 480, 426/490, 495; 554/175

[56] References Cited

U.S. PATENT DOCUMENTS

| | | | |
|---|---|---|---|
| 3,013,887 | 12/1961 | Eolkin | 426/480 X |
| 3,063,840 | 11/1962 | Sullivan | 426/480 |
| 3,352,841 | 11/1967 | Lyon | 426/417 X |
| 3,780,191 | 12/1973 | Langer | 426/231 |
| 4,137,335 | 1/1979 | Holm et al. | 426/480 X |
| 4,216,239 | 8/1980 | Gloppestad | 426/480 X |
| 4,335,146 | 6/1982 | Bladh | 426/417 X |
| 4,344,976 | 8/1982 | Bladh | 426/417 X |
| 4,504,515 | 3/1985 | Hohenester et al. | 426/641 |
| 4,680,565 | 7/1987 | van Schouwenburg | 426/646 |
| 4,778,682 | 10/1988 | Chapman | 426/248 |
| 4,844,922 | 7/1989 | Uemura et al. | 426/104 |
| 4,847,099 | 7/1989 | Elinsky | 426/233 |
| 4,876,103 | 10/1989 | Kawano et al. | 426/574 |
| 4,980,185 | 12/1990 | Small | 426/417 |
| 5,026,565 | 6/1991 | McLachlan et al. | 426/241 |

FOREIGN PATENT DOCUMENTS 463736 3/1950 Canada.

*Primary Examiner*—Arthur L. Corbin
*Attorney, Agent, or Firm*—Reinhart, Boerner, Van Deuren, Norris & Rieselbach

[57] ABSTRACT

A fractionation process for commercially producing low-fat low-cholesterol, reduced calorie, natural beef, fowl and seafood products. The process involves size reduction of the meat in the presence of water with ionic strength pH manipulation and fractionation of the meat into fatty materials, connective tissues and extremely low-fat, low-cholesterol meat particles. The resulting naturally defatted meat exhibits excellent eating and cooking characteristics, extended shelf life and is free from carcinogenic substances found in broiled high fat meat.

23 Claims, 2 Drawing Sheets

PROCESS FOR PRODUCING LOW-FAT MEAT PRODUCTS

This is a continuation-in-part of copending application Ser. No. 07/813,317 filed on Dec. 24, 1991, now U.S. Pat. No. 5,167,977.

BACKGROUND OF THE INVENTION

The present invention relates generally to a method of producing a low-fat meat product. More particularly, the invention relates to a method for the production of naturally defatted and decholesteroled cooked or uncooked meat to provide food products with extremely low-fat and low saturated fat, while also providing significantly reduced cholesterol and calories. The product exhibits enhanced taste and is free from chewiness and toughness normally associated with low-fat meats.

In recent years, a great deal of attention has been focused on the relationship between dietary total fat, saturated fat, and cholesterol intake on the one hand and the incidence of diseases of the blood vessels, such as coronary heart disease and arteriosclerosis, on the other hand. As a consequence of these studies and concerns, medical professionals have been advising the reduction of human consumption of animal fat. This suggestion has resulted in a decline of meat consumption, particularly of red meat which is known to contain high levels of saturated fat and cholesterol. The declined consumption of meat has adversely affected the meat industry resulting in economic losses. On the other hand, the consumption of poultry and fish products have been increasing because they contain less total fat, as well as less saturated fat and cholesterol than red meat.

The red meat industry has reacted to such consumption decline by recently introducing a low-fat hamburger (10-13% fat) using more expensive leaner cuts and adding carrageenan and other moisture binders to sustain juiciness. Other products recently introduced include a 4% fat lean ground beef product containing hydrolyzed oat fiber. Nevertheless, the fat and saturated fat levels in such meats are still quite high with regard to the currently recommended healthy diet (the Surgeon General's recommendation is no more than 30% of calories from fat). Individuals with restricted diet requirements, as well as health-conscious consumers, can obtain only modest reductions of total fat and cholesterol intake. Furthermore, only expensive lean meats can be utilized, which in return make such products cost prohibitive for most consumers and further limit the consumption potential.

Numerous attempts have been undertaken to reduce the fat in red meat. Unfortunately, all approaches have revolved around reducing the fat only to relatively high levels of approximately 4-10% or greater. These fat levels, saturated fat and cholesterol are not reduced to acceptable levels for health conscious consumers and individuals with restricted diet requirements.

Several processes have been developed to treat meats from various animal sources to reduce their fat content. These processes typically have concerned one or more of the following three approaches. First, the removal of some fat from meat has been accomplished by mechanical means such as a crusher, a press or a cutting tool; and these means are exemplified by U.S. Pat. Nos. 4,776,063, 3,780,191, 3,748,148, 3,685,095, 3,078,287, 3,270,041 and 4,948,607; Japanese Patent Publications Nos. 62265396 (871118) and 61158763 (860718); French Pat. No. 2,187,229; and British Pat. No. 1179418. Second, treatments including heat, light, and reaction of gases with meats are described in Japanese Patent Publication Nos. 62278967 (871203), 61058533 (860325), 59173070 (840929), 59084993 (840516) and 58187496 (831101); Soviet Union Publication Nos. 1153874 (850507), 627810 (780821), 502011 (76082) and 1318420 (690331); and U.S. Pat. Nos. 3,687,819, 3,780,075 and 3,532,593. Third, chemical treatments with water or strong chemical reagents are described in Soviet Union Publication Nos. 1329737 (870815), 1063824 (831230) and 1017684 (830515); German Patent Publication Nos. 200156 (830323), 3169440 (850425) and 2119608 (710422); Japanese Patent Publication Nos. 56018537 (810221), 55156569 (801205), 54003099 (790111) and 52040473 (770329); and U.S. Pat. Nos. 3,794,743 and 3,532,593.

Some additives, such as food gels, have also been utilized to reduce the fat level in meat products (U.S. Pat. No. 4,844,922), or a Konjac Mannan gel (U.S. Pat. No. 4,876,103) and milk proteins (U.S. Pat. No. 4,504,515). U.S. Pat. No. 4,847,099 is directed to an apparatus for cooking meat in home and commercial kitchens by suspending the meat in a partially closed container above boiling water wherein the meat is exposed to steam.

A different method for reducing the cholesterol and saturated fat content of red meat and fowl is described in U.S. Pat. No. 4,980,185. This patent is directed to use of a heated unsaturated oil to solubilize the saturated fat and cholesterol of fragmented meat, then an aqueous fluid is used to separate and remove the extracting oil from the oil-processed meat. According to this patent, the fat content was reduced from 20.8% to 18.5% (only an 11% reduction) and cholesterol was reduced from 115mg to 80mg of cholesterol per 100 g beef (only a 30% reduction). Both reductions are relatively insignificant and do not offer much advantage over merely trimming the extra fat manually. Other drawbacks are that the method produces pre-cooked meats, the product must be declared as imitation meats because they contain vegetable oil and the caloric value will be as high as regular high fat ground beef.

Another method for lowering the fat and cholesterol levels in meat is set forth in U.S. Pat. No. 4,778,682. In this patent, a thin layer of meat is exposed to ultraviolet light. The meat is then comminuted in a chilled bowl with the addition of iced water, edible acid, salt, and food phosphates until a quantity of fat and cholesterol separate from the meat emulsion and adhere to the inner surface of the cold bowl. The limitation of this invention is the impracticality of having to expose thin layers of meat to ultraviolet light for up to twelve hours. In addition, health hazards might be created by virtue of forming free radicals by exposing the meat to radiation.

U.S. Pat. No. 4,680,183 describes another example of using heat treatment in the production of low-fat meat from cheaper cuts of meat. Furthermore, the process of the removal of sterols and/or lipid components from lipid containing food products using sub or super-critical fluids (e.g., carbon dioxide) is explained in U.S. Pat. No. 5,026,565. This patent describes food initially processed to produce an intermediate moisture product with substantially all of the free water, but not all of the bound water is removed to produce a moisture level between 30-55%. Such an intermediate product is treated with super-critical carbon dioxide to remove the lipid. The product can be treated with water and fat to provide a reconstituted meat product. Such chemical treatments are, however, considered undesirable for food products. Recent report indicate there are detrimental effects of sub or super-critical fluids on blood cholesterol. At the least, these products would be perceived by consumers as being artificial products.

Canadian Patent No. 463,736 is directed to a process for defatting pork skins for gelatin manufacturing. The process involves coarse and fine grinding of pork skins which are subjected to dilution and flotation in water to remove the fat from animal tissues. These steps are followed by agitation in a moving current of air to produce a suitable base for gelatin manufacturing.

In another approach U.S. Pat. No. 3,780,191 describes a process for reducing the fat content of frozen meat by comminuting a frozen portion of meat and obtaining discrete frozen meat particles and discrete frozen fat particles. Upon the addition of water, the particles are mechanically separated into reduced fat meat and fat particles. Such a process could reduce the visible fat in frozen meat into a level achievable by manual trimming of fats, but it does not remove the difficult to eliminate, intramuscular fat, or the fat-laden connective tissues and the cholesterol which is located in the cell membranes.

Despite all these innovations, the currently known procedures collectively remain ineffective for the purpose of substantially reducing total fat and cholesterol of meats, fowl, and sea foods. All of the available procedures typically involve the grinding or crushing of meat followed by chemical and physical extraction with hot water, steam, heat, pressure, or some combination of these treatments. One of the primary challenges remaining is the appreciable removal of cholesterol and total fats located in inaccessible components of the meat. Virtually all of the cholesterol in edible meats exists in the free form and is located in the membranes of the cell within the meat tissue rather than in the meat (muscle) itself. On the other hand, most of the fat exists in the adipose tissues wherein the fat is embedded in connective tissues. Intramuscular fat represents a good portion of marbling and is the most difficult to eliminate. However, neither cholesterol, fat nor saturated fat can be effectively extracted from edible meats and meat products simply by employing heat, water, or steam. Water and steam can be employed to melt some fats, which then can be physically removed in part. Nevertheless, these treatments cannot substantially extract the cholesterol or fat and saturated fats of meat, particularly in the case of red meats such as beef, pork and lamb.

The need for a commercial process for adding value to the less demanded high fat meats and low value fish has always been desired as well. In addition to the nutritional attributes of such low-fat products, the organoleptic properties of the finished products could be greatly improved resulting in a significant profit for the industry.

It is therefore an object of the invention to provide an improved natural method for producing a low-fat meat product.

It is another object of the invention to provide a novel method for producing a low-fat red meat, fowl or fish product.

It is a further object of the invention to provide an improved meat product having low-fat content and low-cholesterol content.

It is yet another object of the invention to provide an improved low-fat meat product and method of manufacture producing a meat product having intramuscular and connective tissue fat and intracellular cholesterol removed.

It is still a further object of the invention to provide a novel method of producing high quality meat products from low quality starting meat products.

Other objects and features of the invention will be set forth in the detailed description, examples and claims and in the drawings described below:

SUMMARY OF THE INVENTION

The present invention provides methods for commercially producing low-fat, low-cholesterol and reduced calorie natural cooked or uncooked meat suitable for direct consumption. In addition, it has been found when meats are treated by the method of the present invention, they exhibit excellent organoleptic properties (texture, taste, and flavor). In the case of uncooked meats processed by the invention the meat retains more juiciness and less shrinkage during cooking. It is a further aspect of the present invention to produce meats with extended shelf life when refrigerated or frozen as compared to conventional meats. The invention also produces meat products which show no deterioration of the flavor upon reheating or repreparation and do not undergo any degree of fat oxidation.

In one broad aspect of the present invention, there is provided a method for fractionating meats into (1) fatty materials, and into (2) extremely low-fat, low-cholesterol meats suitable for various dietary needs. The present invention seeks to substantially overcome the problem of fat and cholesterol present in the meat beyond conventional trimming or rendering processes used with either raw or cooked meats.

The present process produces reduced fat and cholesterol meats in uncooked or raw state meats and in cooked meats as well, both being suitable for direct consumption as well as for prepared dishes and frozen meals. Furthermore, the reduced pH featured in the process results in significantly increasing the stability, extending the shelf life and reducing health hazards and sickness associated with refrigerated meats.

DETAILED DESCRIPTION OF PREFERRED EMBODIMENTS

In the present invention the term "meat" shall include, without limitation, both cooked and uncooked meats, and all edible meats, such as, for example, beef, pork, lamb, buffalo, deer, chicken, turkey, hens, ducks, fish, shrimp, shellfish and the like.

Figure 1:
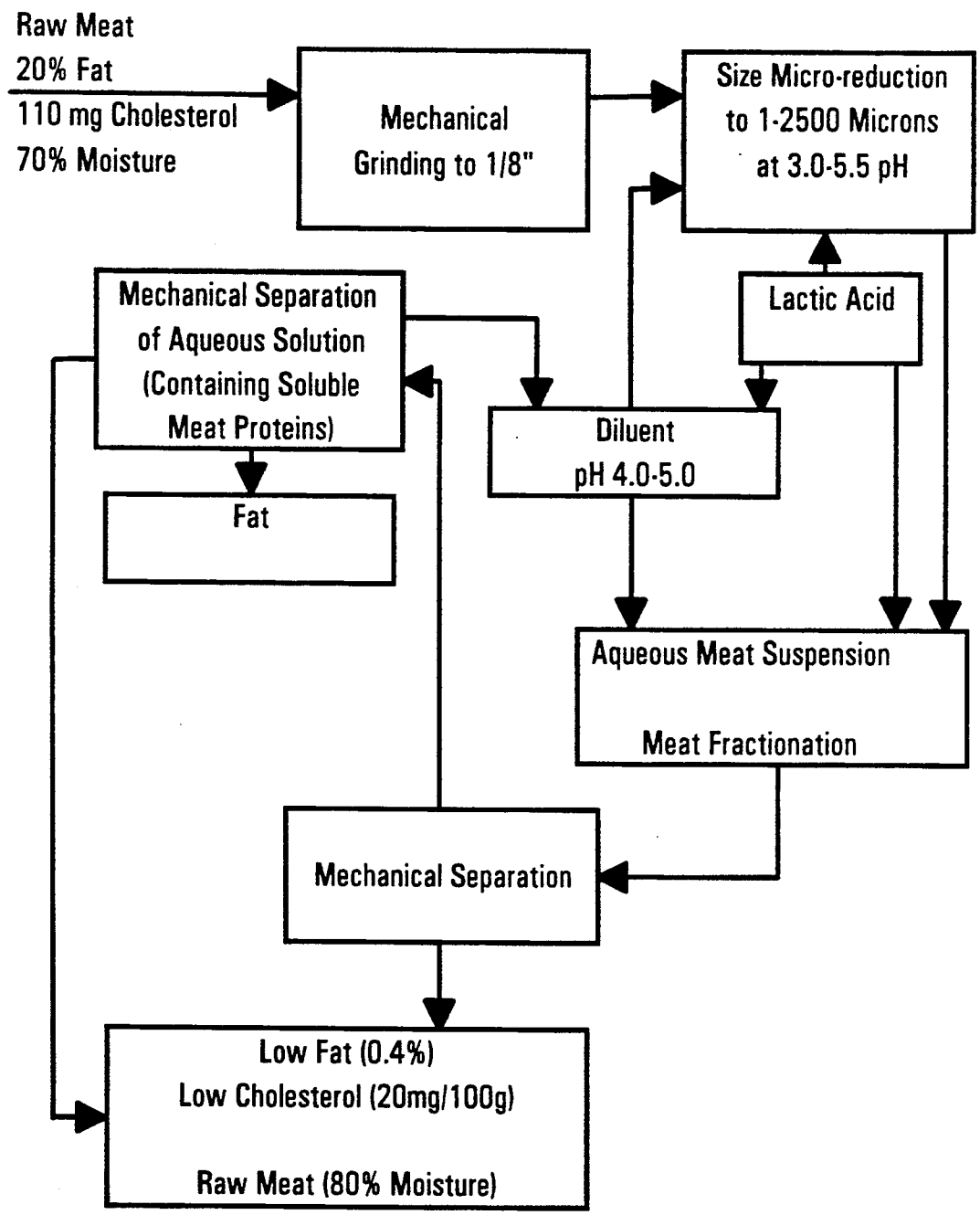
FIG. 1 is a flow diagram schematically showing a preferred method of making low-fat meat products.

Referring to the flow diagram of FIG. 1, the first step in one form of the invention is the size reduction step, including micro-reduction, of the starting meat material. In the case of the illustrated size reduction of beef red meat, the size range is between approximately 0.5–2000 microns in diameter utilizing a size disintegrator manufactured by Stephan Corp. (Stephan Universal Machine Type VCM-12) with sharp cutting knives. In the most preferred embodiment the size reduction is done in the presence of water (preferably a 1:1 ratio but this ratio can range widely).

The purpose of the size micro-reduction step is to "disintegrate" connective tissues, adipose tissues, fats, cell membranes and proteins and increase the surface area to release various types of fats and cholesterol. The precise size range suitable to cause such "disintegration" can, of course, vary depending on the type of meat (for example, beef, lamb, fish, and poultry) and even the particular structure of any one individual animal's fat structure (arising from, e.g., diet or breeding).

It is important to avoid re-emulsifying the fats and to use a disintegrator adequate to result in the tissues and cells being substantially disrupted. In the most preferred process the fat and cholesterol are thrown away from the center of the vessel (when the size reduced meat is in a liquid, or water based, meat suspension) by the action of the rotation of the vessel. This step in this particular form of the invention helps to prevent re-emulsification of the fats. Another purpose of this step is to tenderize the collagen and connective tissues in order to produce a smooth consistency and reduce chewiness and toughness in the finished product. This step also facilitates an acidification step to be described hereinafter.

Size micro-reduction can be performed in the presence or absence of water, and the pH can range from 2.0–6.0 when water is added (or about 5.0–7.0 when no water is present). The temperature of this step is generally irrelevant as long as the mixture is in the liquid state. The process can be performed between about 30°–160° F., and most preferably at about 70° F.

Figure 2:
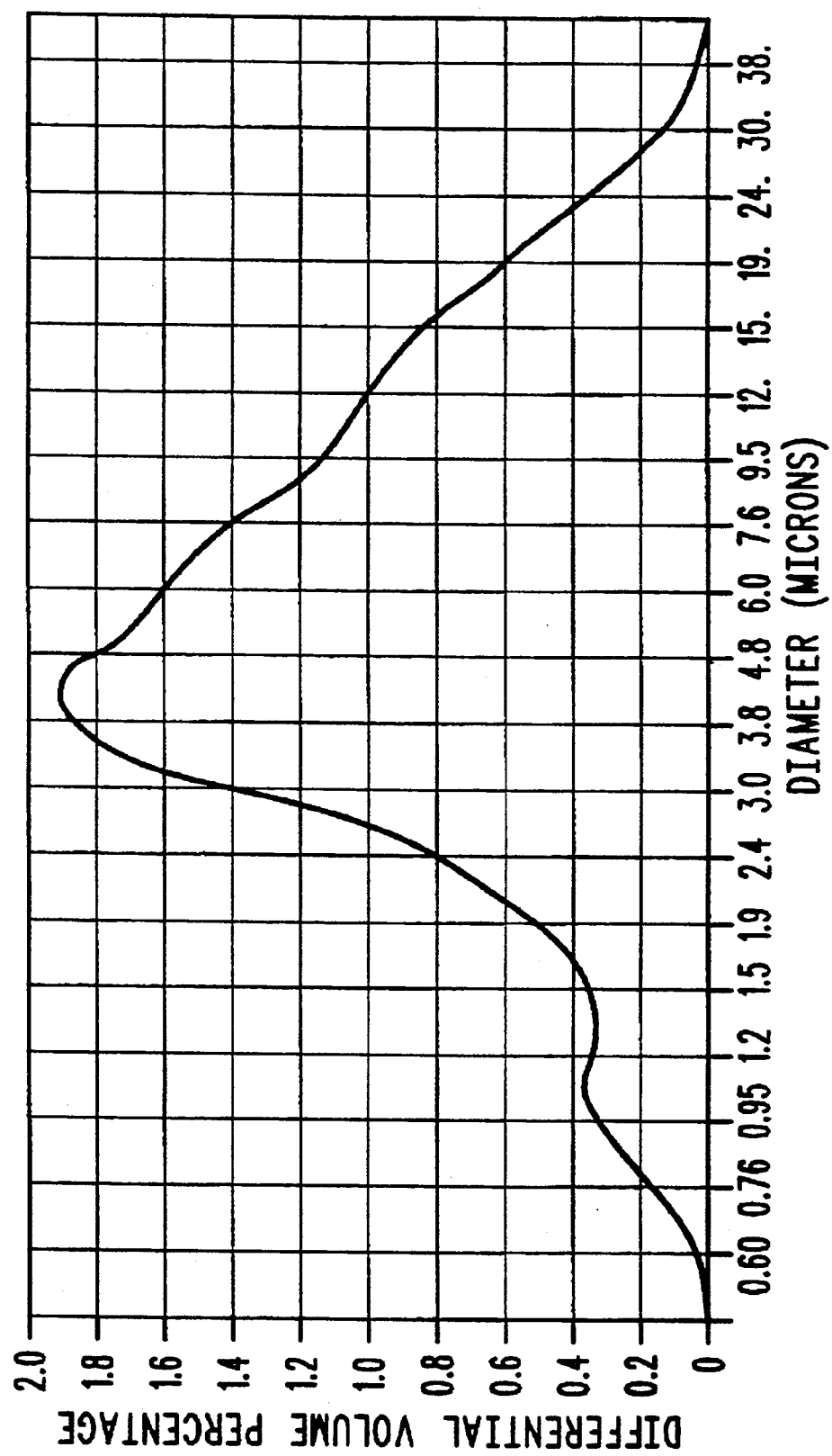
FIG. 2 illustrates a preferred particle size distribution for a disintegrated red meat.

In a most preferred method and product, the resulting particle size after micro-reduction in a water solution is shown in FIG. 2 and in Tables 1 and 2. The final size is about 0.6–40 microns diameter with a mean size of about 5.24 microns. However, adequate disintegration for purposes of the removal of fat leads to a particle size of less than about 2000–2500 microns.

TABLE I

|  |  | PERCENTILES |
|---|---|---|
| Geometric Mean size: | 5.239 μm |  |
| Geom. Std Deviation: | 2.196 μm | 0.100% Volume above 34.04 um |
| Geom. Skewness: | 0.378 | 1.000% Volume above 26.69 um |
| Geom. Coeff Variation: | 41.92 | 6.000% Volume above 18.02 um |
|  |  | 22.00% Volume above 9.908 um |
| Arithmetic Mean Size: | 7.022 μm | 50.00% Volume above 5.147 um |
| Median Size: | 5.048 μm | 78.00% Volume above 3.032 um |
| Mode Size: | 4.410 μm | 94.00% Volume above 1.336 um |
| Kurtosis: | 3.452 | 99.00% Volume above 0.800 um |
| Arith Std Deviation | 5.912 μm | 99.90% Volume above 0.621 um |

TABLE II

Volume Distribution Data (see FIG. 2)
Total Volume: 39,409,121 (relative standard)

| Channel Number | Size (Microns) | Relative Volume | Cumulative Vol. % | Channel No. | Size (Microns) | Relative Volume | Cumulative Vol. % |
|---|---|---|---|---|---|---|---|
| 1 | 0.532 | 0 | 100.0 | 33 | 1.569 | 138664 | 92.4 |
| 2 | 0.550 | 5371 | 100.0 | 34 | 1.623 | 145501 | 92.0 |
| 3 | 0.569 | 7648 | 100.0 | 35 | 1.678 | 149336 | 91.7 |
| 4 | 0.589 | 10673 | 100.0 | 36 | 1.736 | 157963 | 91.3 |
| 5 | 0.609 | 13824 | 99.9 | 37 | 1.796 | 172006 | 90.9 |
| 6 | 0.630 | 19563 | 99.9 | 38 | 1.858 | 179075 | 90.4 |
| 7 | 0.652 | 25695 | 99.8 | 39 | 1.921 | 194848 | 89.9 |
| 8 | 0.674 | 33074 | 99.7 | 40 | 1.987 | 214559 | 89.4 |
| 9 | 0.697 | 41721 | 99.7 | 41 | 2.056 | 234804 | 88.8 |
| 10 | 0.721 | 51576 | 99.5 | 42 | 2.126 | 243464 | 88.2 |
| 11 | 0.746 | 62621 | 99.4 | 43 | 2.200 | 263049 | 87.6 |
| 12 | 0.772 | 72058 | 99.2 | 44 | 2.275 | 291334 | 86.9 |
| 13 | 0.798 | 83437 | 99.0 | 45 | 2.353 | 319559 | 86.1 |
| 14 | 0.825 | 98065 | 98.8 | 46 | 2.434 | 338167 | 85.3 |
| 15 | 0.854 | 105281 | 98.5 | 47 | 2.518 | 370259 | 84.4 |
| 16 | 0.883 | 112638 | 98.3 | 48 | 2.604 | 397818 | 83.4 |
| 17 | 0.914 | 119963 | 98.0 | 49 | 2.694 | 419926 | 82.4 |
| 18 | 0.945 | 127836 | 97.6 | 50 | 2.787 | 464472 | 81.2 |
| 19 | 0.977 | 135889 | 97.3 | 51 | 2.882 | 515659 | 80.0 |
| 20 | 1.011 | 141584 | 97.0 | 52 | 2.981 | 531505 | 78.7 |
| 21 | 1.046 | 144994 | 96.6 | 53 | 3.084 | 559402 | 77.3 |
| 22 | 1.082 | 144018 | 96.2 | 54 | 3.190 | 610704 | 75.8 |
| 23 | 1.119 | 143782 | 95.9 | 55 | 3.299 | 650240 | 74.2 |
| 24 | 1.157 | 142676 | 95.5 | 56 | 3.413 | 679705 | 72.5 |
| 25 | 1.197 | 141442 | 95.1 | 57 | 3.530 | 703894 | 70.8 |
| 26 | 1.238 | 138364 | 94.8 | 58 | 3.652 | 718956 | 69.0 |
| 27 | 1.281 | 135729 | 94.4 | 59 | 3.777 | 732028 | 67.1 |
| 28 | 1.325 | 134789 | 94.1 | 60 | 3.907 | 739928 | 65.3 |
| 29 | 1.370 | 132996 | 93.8 | 61 | 4.041 | 748849 | 63.4 |
| 30 | 1.418 | 131466 | 93.4 | 62 | 4.180 | 750034 | 61.5 |
| 31 | 1.466 | 132894 | 93.1 | 63 | 4.324 | 749254 | 59.6 |
| 32 | 1.517 | 135905 | 92.7 | 64 | 4.472 | 753011 | 57.7 |
| 65 | 4.626 | 730605 | 55.8 | 97 | 13.64 | 355649 | 12.5 |
| 66 | 4.785 | 722469 | 53.9 | 98 | 14.11 | 351917 | 11.6 |
| 67 | 4.950 | 707677 | 52.1 | 99 | 14.60 | 340970 | 10.7 |
| 68 | 5.120 | 707000 | 50.3 | 100 | 15.10 | 321022 | 9.84 |
| 69 | 5.296 | 700169 | 48.5 | 101 | 15.62 | 301656 | 9.05 |
| 70 | 5.478 | 678691 | 46.8 | 102 | 16.15 | 295328 | 8.29 |
| 71 | 5.666 | 666037 | 45.1 | 103 | 16.71 | 285593 | 7.56 |
| 72 | 5.861 | 662094 | 43.4 | 104 | 17.28 | 271651 | 6.85 |
| 73 | 6.062 | 638789 | 41.7 | 105 | 17.88 | 263931 | 6.17 |

TABLE II-continued

Volume Distribution Data (see FIG. 2)
Total Volume: 39,409,121 (relative standard)

| Channel Number | Size (Microns) | Relative Volume | Cumulative Vol. % | Channel No. | Size (Microns) | Relative Volume | Cumulative Vol. % |
| --- | --- | --- | --- | --- | --- | --- | --- |
| 74 | 6.271 | 617183 | 40.1 | 106 | 18.49 | 240908 | 5.53 |
| 75 | 6.486 | 606612 | 38.6 | 107 | 19.13 | 225626 | 4.94 |
| 76 | 6.709 | 603677 | 37.1 | 108 | 19.78 | 212050 | 4.38 |
| 77 | 6.940 | 594500 | 35.5 | 109 | 20.46 | 198002 | 3.86 |
| 78 | 7.178 | 574588 | 34.1 | 110 | 21.17 | 186120 | 3.37 |
| 79 | 7.425 | 555349 | 32.6 | 111 | 21.89 | 171861 | 2.92 |
| 80 | 7.680 | 544786 | 31.2 | 112 | 22.65 | 154247 | 2.51 |
| 81 | 7.944 | 525944 | 29.9 | 113 | 23.43 | 142682 | 2.13 |
| 82 | 8.217 | 502702 | 28.6 | 114 | 24.23 | 125300 | 1.79 |
| 83 | 8.499 | 483902 | 27.3 | 115 | 25.06 | 112640 | 1.49 |
| 84 | 8.792 | 470668 | 26.1 | 116 | 25.93 | 103707 | 1.21 |
| 85 | 9.094 | 461300 | 24.9 | 117 | 26.82 | 86484 | 0.97 |
| 86 | 9.406 | 454417 | 23.8 | 118 | 27.74 | 77069 | 0.76 |
| 87 | 9.730 | 447496 | 22.6 | 119 | 28.69 | 64793 | 0.58 |
| 88 | 10.06 | 441184 | 21.5 | 120 | 29.68 | 49409 | 0.44 |
| 89 | 10.41 | 431725 | 20.4 | 121 | 30.70 | 39978 | 0.33 |
| 90 | 10.77 | 418299 | 19.3 | 122 | 31.75 | 30543 | 0.24 |
| 91 | 11.14 | 408630 | 18.2 | 123 | 32.84 | 26456 | 0.16 |
| 92 | 11.52 | 398891 | 17.2 | 124 | 33.97 | 20480 | 0.10 |
| 93 | 11.92 | 395122 | 16.2 | 125 | 35.14 | 16384 | 0.06 |
| 94 | 12.33 | 375406 | 15.2 | 126 | 36.35 | 10240 | 0.02 |
| 95 | 12.75 | 370279 | 14.3 | 127 | 37.60 | 4096 | 0.01 |
| 96 | 13.19 | 360593 | 13.4 | 128 | 38.89 | 0 | 0.00 |

Another feature of the most preferred form of the invention is the addition of food grade acid to the meat (before or after size reduction) or the meat and water mixture to reduce the pH of liquid in contact with the size reduced meat or the liquid in a meat suspension to a pH of roughly 2.0–6.0. Reduction of the pH into the acidic range controls the microbiological environment, suppressing the growth of any spoilage microorganisma (i.e., pseudomonads and related Gram-negative organisma) in addition to microorganisms that might produce toxins (i.e., *Clostridium botulinum*) and restrict the growth of foodborne pathogens (i.e., Salmonella, *Stophylococcus aurous, Listeria monocytogens*).

In controlling the meat pH or aqueous meat solution pH, any food grade acids can provide the necessary pH reduction or control. Organic acids such as acetic, adipic, citric, malic, lactic, succinic, and tartaric, glucono delta-lactone and any inorganic acids such as phosphoric, sulfuric and hydrochloric acids can also be used. Naturally bases, such as NaOH, can be used if it is desireable to controllably increase the pH for further processing purposes. While acids such as ascorbic, benzoic, erythorbic, propionic and sorbic can be used, the expenses can be somewhat prohibitive for quantities needed to achieve the proper acidification. One of the most preferred acids is lactic acid which is used in an amount sufficient to suppress the pH (or control the pH) and to modify the ionic strength of the modified meat suspension. Without limitation on the scope of the invention, it is believed the ionic strength is affected by chelating some of the divalent metal ions that exist in the meat structure. Furthermore, since overall protein structure is negatively charged, acid provides positive ions which react with the negative ions of the meat and bring the pH close to the isoelectric point of proteins, thereby aiding in releasing fats and cholesterol from intramuscular proteins and connective tissues. This mechanism is contrary to other patents and known processes which utilize buffering salts to solubilize the proteins, increase ionic strength and increase pH of meat. Such buffering salts were found to be detrimental to this process in terms of producing excessive amounts of connective tissues which accumulate during agitation and processing and could bind the fat and hinder fat removal.

In another embodiment of the present invention mentioned hereinbefore, no water is added to meat before size micro-reduction where the pH of the size reduced meat can be about 6.0–7.0. The size micro-reduced meat (including natural meat fluids) is then transferred into a processing tank where sufficient amounts of water can be added for further processing. The water can be added in the ratio of about 0.25:1 to 40:1 times the weight of meat being processed.

In one form of the invention, it was found that the combination of water and acid at a pH of approximately 2.0–5.5 caused the connective tissues to gelatinize at low temperatures. These conditions then cause the release of substantially all the entrapped fat, as well as intramuscular fat and cholesterol which remains suspended in the liquid medium. These unwanted meat components can then be recovered during mechanical separation afterwards. Furthermore, the removal of gelatinized, treated connective tissues yielded unexpectedly smooth meat completely free from chewiness and toughness associated with conventional "low-fat" meats. The addition of water transforms the size reduced meat into an aqueous meat suspension which is capable of being fractionated and separated during centrifugation or other mechanical separation process. Adding water, or other water based solutions, is particularly useful in releasing fat and cholesterol from cell membranes, reducing the viscosity of the aqueous meat suspension and enhancing the separation and fractionation of fat, cholesterol and fat-laden connective tissues. In addition, the water creates a density gradient for further fractionation steps.

In another embodiment of the present invention described before, when water was not added to the size reduced meat suspension, a finished low-fat meat was produced having approximately 3–5% fat (see Example 5).

When processing size micro-reduced meat using an aqueous meat suspension, the meat in the aqueous mixture is exposed to centrifugation in a decanter and/or a high speed centrifuge (both are commercially available). Centrifugation separates the predominantly meat proteins from the aqueous solution which contains primarily diluent, fat and soluble meat proteins. The aqueous solution is suitable for passage through a disc centrifuge for further separation of fat; and diluent and low-fat soluble proteins which are returned to the raw low-fat meat for further use.

The finished dry meat portion can be further processed by the addition of ingredients to retain the juiciness during cooking. Also, natural flavors can be added to produce a range of flavored meats suitable for numerous applications. In addition, animal blood can be added to the separated meat to recolorize the processed meat. Water removed from the aqueous meat suspension can be recycled as a diluent in the aqueous meat suspension for virtually unlimited cycles.

Furthermore, in other finishing steps after recovery of the processed low-fat meat, neutralizers, such as sodium hydroxide and baking soda, can be added to the low-fat meat to increase pH to produce a wide range of low-fat products, such as hot dogs, cold meats and canned processed meats. In addition, one can add emulsifying salts, such as phosphates and citrates.

EXAMPLES

The present invention will be further described by reference to the following nonlimiting examples which do not restrict the scope of the present invention to ingredients, experimental designs, processing parameters or the illustrated data. In addition to these examples, further examples are incorporated from application Ser. No. 07/813,317 which is incorporated by reference.

EXAMPLE (1)

Fifty pounds of beef (25% fat) was ground in a standard meat grinder. The ground meat was subjected to size micro-reduction utilizing a Stephan Universal Machine, type VCM-12, to produce a modified meat suspension with no addition of water being made to the meat. About 50 lbs. of the modified meat suspension were mixed uniformly with 900 lbs. of water (70° F.) in a processor to form an aqueous meat suspension with pH of about 6.2. A three phase centrifuge decantor (model LX-409, Alpha Laval Group, Indianapolis, Ind.) was used to remove fat and water from the meat. The resulting separated meat had a fat content of about 0.3%.

EXAMPLE (2)

The same procedure of Example (1) was followed except lactic acid was added to the ground meat before size micro-reduction to obtain a pH of about 2.0, and diluent water pH was adjusted to a value of 2.0. The resulting meat had a fat content of about 0.3%.

EXAMPLE (3)

The same procedure of Example (2) was followed except water was added to the ground meat before size micro-reduction at the ratio of 0.25:1 to 5:1 for the water to meat ratio. The resulting meat had a fat content of about 0.3%.

EXAMPLE (4)

The same procedure of Example (1) was followed, except lactic acid was mixed with a small amount of water and added to the ground meat before size micro-reduction to obtain a pH of about 3.0, and diluent water pH was adjusted to 3.0. The resulting processed meat had a fat content of 0.3%.

EXAMPLE (5)

Five hundred pounds of ground beef (22% fat content) was subjected to size micro-reduction, then centrifuged in a three-phase decantor without any further water being added and fat was substantially eliminated to produce low-fat meat (about 3-5% fat).

EXAMPLE (6)

The same procedure as Example (4) was followed, except the particle size of the modified fat suspension after size micro-reduction ranged between 50-2000 microns. The fat content of the processed meat was approximately 3% fat.

EXAMPLE (7)

The same procedure of Example (1) was followed except 50 lbs. of modified meat suspension was diluted to 2000 lbs. (40 times the meat weight). A two phase-decantor was employed to separate the low-fat meat from the diluent solution (containing diluent, fat and soluble proteins). A three phase separator AFPX-513 (manufactured by the Laval Group, Indianapolis, Ind.) was utilized to separate diluent, fat and soluble proteins which were added to the low-fat meat obtained formerly. The fat content of the resulting low-fat meat was 0.2%.

EXAMPLE (8)

The resultant low-fat meat from Example (3) was mixed with a neutralizer (sodium hydroxide and baking soda), barley flour xanthan gum, guar gum and natural flavors to produce low-fat meat patties (pH 6.4, 0.3% fat). The resulting product exhibited a smooth texture, good flavor and excellent smell.

EXAMPLE (9)

The same procedure of Example (1) was followed except the temperature of the diluent water was about 110°-130° F. The resulting processed meat had a fat content of about 0.3%.

EXAMPLE (10)

The same procedure as Example (3) was followed except the temperature of the acidified diluent water was 140°-160° F. Again, the processed meat had a fat content of about 0.3%.

EXAMPLE (11)

Fifty pounds of ground beef (20% fat content) was cooked to 180°-200° F. for 10 minutes in a processor with continuous agitation. Melted fat was removed and cooked meat was subjected to size micro-reduction and diluted in 900 lbs. water (pH 6.0) and then centrifuged in a three-phase decantor to produce a processed, cooked low-fat meat (1.0% fat).

EXAMPLE (12)

Same procedure as Example (11) was followed except the pH of the liquid in the diluted cooked meat suspension was adjusted to 4.0-5.0. The resulting processed meat had a fat content of about 0.3%.

EXAMPLE (13)

The same procedure as Example (8) was followed except frozen concentrated red blood cells were added at 1–2% weight fraction to compensate for blood cells lost to the diluent water during processing of the meat. The resulting processed meat had a 0.3% fat content.

EXAMPLE (14)

The same procedure as Example (1) was followed except water was added to the startinq meat to carry out the size reduction step. Water to meat ratios used ranged from 14–40:1. The resulting meat had a fat content of about 0.2% for 1:1 water to meat ratio with small fat percentage increases (about 0.1% fat content) outside this specific ratio.

What is claimed is:

1. A process for producing low-fat, low-cholesterol, raw, uncooked meat comprising the steps of:
   (a) reducing the size of a starting raw, uncooked meat in the presence of water to a particle size range causing disintegration of connective tissues, adipose tissues, fats and cell membranes in the meat;
   (b) adjusting the amount of water present with the size reduced starting meat such that the water content is between about 0.25 to 40 times the weight of the meat to form an aqueous meat suspension;
   (c) skimming fat and fat-containing tissues from said aqueous meat suspension, said aqueous meat suspension having a pH controlled to be about 2.0–5.5; and
   (d) mechanically separating the fat and fat-containing tissues from said aqueous meat suspension.

2. The method as defined in claim 1 wherein the size reduction is performed at a pH of about 2.0–6.0.

3. A method for processing high fat meats, comprising the steps of:
   (a) reducing the size of a starting high fat meat in the presence of water to particle sizes in the range of about 0.6–2000 microns diameter, said starting meat including natural fluids;
   (b) adjusting the water content present with said size reduced starting meat to form an aqueous meat suspension;
   (c) controlling the pH of said aqueous meat suspension to be in the range of about 2.0–5.5; and
   (d) mechanically separating fat and fat-containing tissues from said aqueous meat suspension.

4. The method as defined in claim 3 wherein the water in the aqueous meat suspension is about 1–40 times the weight of said starting meat.

5. The method as defined in claim 3 wherein step (c) includes the step of adding an acid to said starting meat and/or to said aqueous meat suspension in order to control the pH.

6. The method as defined in claim 3 wherein said starting meat comprises cooked meat.

7. A process for producing a low-fat, low-cholesterol, raw, uncooked meat, comprising the steps of:
   (a) reducing the size of a starting raw, uncooked meat in the presence of water to a particle size range causing disintegration and release of connective meat tissue, adipose tissue, fats and cell membranes in the meat;
   (b) adjusting the amount of water present with said size reduced starting meat to form an aqueous meat suspension and controlling the pH of said aqueous meat suspension to be about 2.0–5.5; and
   (c) removing fat and fat-containing tissues from said aqueous meat suspension.

8. The method as defined in claim 7 wherein the reduced size of said starting meat is about 0.5–2.000 microns diameter.

9. The method as defined in claim 7 wherein pH is further controlled in the size reducing step to be in the range of 2.0–7.0.

10. The method as defined in claim 7 wherein the pH in step (b) is controlled by adding a food grade acid to said aqueous meat suspension.

11. The method as defined in claim 10 wherein said food grade acid is selected from the group consisting of lactic acid, ascorbic acid, citric acid, adipic acid, tartaric acid, acetic acid, malic acid, succinic acid, glucono delta-lactone, benzoic acid, erythorbic acid, propionic acid, sorbic acid, phosphoric acid, sulfuric acid and hydrochloric acids.

12. The method as defined in claim 11 wherein said water in step (a) is added in the ratio of about 0.26:1.0 to 40:1 for water to meat weight percentage ratios.

13. A method for producing a low-fat, low-cholesterol, reduced calorie, raw meat with extended shelf life, comprising the steps of:
   (a) reducing the size of a starting raw meat to a particle size range causing disintegration of connective tissues, adipose tissues, fats and cell membranes in the meat;
   (b) adding water to the size reduced starting meat in an amount of about 0.5–40 times the weight of the starting meat to form an aqueous meat suspension and reducing the pH of said aqueous meat suspension to about 2.0–4.0; and
   (c) separating fat and fat-containing tissues from said aqueous meat suspension to produce said low fat, low cholesterol, raw meat.

14. The method as defined in claim 13 wherein the pH of said aqueous meat suspension is controlled by adding a food grade acid to said starting meat during the size reducing the step and/or to said aqueous meat suspension.

15. The method as defined in claim 13 further including the steps of:
   (d) separating said low fat, low cholesterol meat from said aqueous meat suspension; and then
   (e) adding animal blood to said low fat, low cholesterol meat.

16. The method as defined in claim 15 wherein a neutralizer is added to the separated meat to increase the pH of the meat to substantially achieve the natural pH of the starting meat.

17. A process for producing low fat, low cholesterol, raw, uncooked meat, comprising the steps of:
   (a) reducing the size of a starting raw, uncooked meat in the absence of added water to a particle size range causing disintegration of connective tissues, adipose tissues, fats and cell membranes in the meat;
   (b) adding water to the size reduced starting meat such that the water content is between about 0.25 to 40 times the weight of the meat to form an aqueous meat suspension having a pH controlled to be about 2.0–5.5; and
   (c) mechanically separating fat and fat-containing tissues from said aqueous meat suspension.

18. The process as defined in claim 17 wherein the particle size of the size reduced starting meat is in the range of about 0.5–2000 microns diameter.

19. The process as defined in claim 17 wherein said step (c) of mechanically separating fat and fat-containing tissues comprises a two step procedure including high speed centrifugation and disc centrifugation.

20. A process for producing low fat, low cholesterol meat, comprising the steps of:
 (a) reducing the size of a starting meat to a particle size range causing disintegration of connective tissues, adipose tissues, fats and cell membranes in the meat;
 (b) adding water to the size reduced starting meat such that the water content is between about 0.25–40 times the weight of the meat to form an aqueous meat suspension;
 (c) controlling the pH of said aqueous meat suspension to be about 2.0–5.5; and
 (d) mechanically separating fat and fat-containing tissues from said aqueous meat suspension.

21. The process as defined in claim 20 wherein said aqueous meat suspension has a temperature of about 110°–160° F.

22. The process as defined in claim 20 wherein the step of reducing the size of said starting meat is performed without adding water.

23. The process as defined in claim 20 wherein the starting meat comprises a cooked meat.

* * * * *

UNITED STATES PATENT AND TRADEMARK OFFICE
CERTIFICATE OF CORRECTION

PATENT NO. : 5,221,554
DATED : June 22, 1993
INVENTOR(S) : Aly Gamay

It is certified that error appears in the above-identified patent and that said Letters Patent is hereby corrected as shown below:

Column 12, Line 4,    cancel "2.000" and insert
                                       -- 2000 --.

Signed and Sealed this

Eleventh Day of April, 1995

Attest:

BRUCE LEHMAN

Attesting Officer      Commissioner of Patents and Trademarks